Patented Oct. 2, 1928.

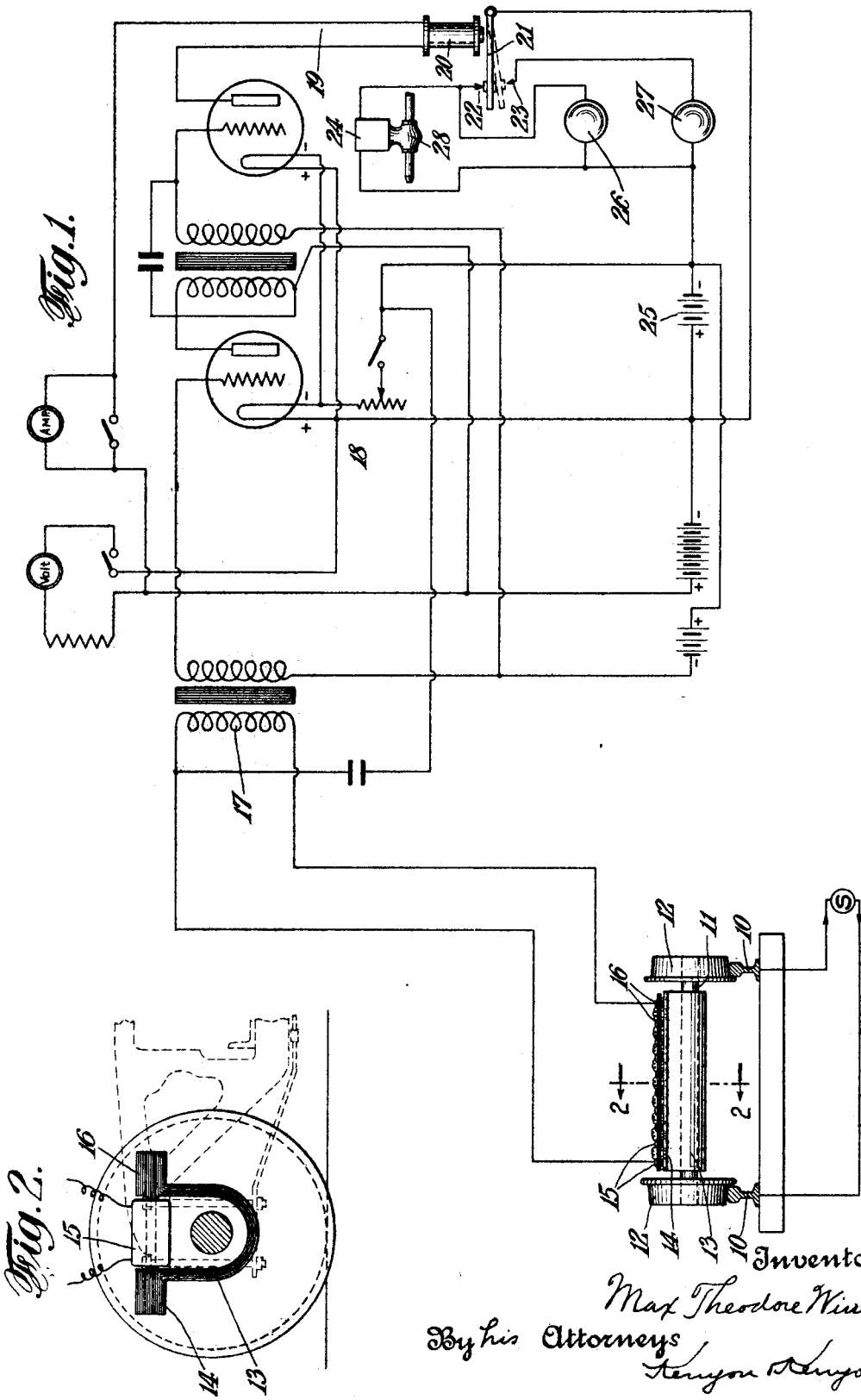

1,685,894

UNITED STATES PATENT OFFICE.

MAX THEODORE WINTSCH, OF LANCASTER, PENNSYLVANIA, ASSIGNOR TO THE LOWELL-WINTSCH AUTOMATIC TRAIN CONTROL CORP., OF LANCASTER, PENNSYLVANIA, A CORPORATION OF DELAWARE.

AUTOMATIC TRAIN-CONTROL APPARATUS.

Application filed October 20, 1926. Serial No. 142,789.

This invention relates to automatic train control apparatus and has for an object a simple and efficient electrically-controlled means for automatically stopping a train when it enters a block already occupied by a train or upon interruption of the control circuit.

According to the invention, an exhaust to atmosphere of the air brake line is controlled by a valve held closed by a solenoid when the latter is energized and which valve opens automatically by the action of brake pipe pressure upon deenergization of the solenoid. The solenoid circuit is controlled by a relay energized by current induced in its field circuit by current shunted through the front axle of the train from the rails. Current is supplied to the rails at the exit end of the block so that, when a train is already in the block, all the current will be shunted therethrough so that there will be insufficient current available for a second train entering the block. As a result, the relay circuit will be deenergized, thereby opening the solenoid circuit and permitting the electro-pneumatically operated air line valve to open, thereby applying the brakes. Also, if for any reason any of the circuits are interrupted, the solenoid will be deenergized, thereby applying the brakes.

Preferably current is obtained for energizing the relay by enclosing the front axle of the train with a metal sheet bent into U-shape on the top of which are supported a plurality of serially connected coils. Flow of alternating or pulsating direct current through the axle induces current in the coils which is supplied to the input of a vacuum tube amplifier, the output circuit of which includes the field winding of the relay. As long as there is current flowing through the axle, the relay is energized. Upon failure of such flow, the relay is deenergized and the brakes applied.

Other objects, novel features and advantages of the invention will be apparent from the following specification and accompanying drawings, wherein Figure 1 is a diagrammatic view of an apparatus embodying the invention, and Fig. 2 is a section taken substantially on the line 2—2 of Fig. 1.

10 designates the usual rails upon which a train runs and which are connected at the exit end of a block in the usual manner with any suitable source of alternating current and are electrically connected at the entrance end of the block by means of the standard track relay. 11 is an axle of an engine or the like provided with wheels 12 running upon the tracks 10. Current is thus shunted through the axle 11 between the tracks 10. A metallic trough-shaped member 13 surrounds the axle 11 and has horizontally projecting ears 14. Preferably the member 13 is made up of several laminations of silicon iron. A plurality of serially connected coils 15 are supported between the upper edges of the member 13 by laminated cores 16 projecting beyond the ends of the coils. The coils 15 are connected through the transformer 17 with the input of a vacuum tube amplifier 18, the output circuit 19 of which includes the field winding of a relay 20. The armature 21 of the relay 20 is adapted to engage either the contact 22 or the contact 23. When engaged with the contact 22, it closes circuits, in parallel, through the solenoid 24, battery 25 and lamp 26. When engaged with the contact 23, it closes a circuit through battery 25 and lamp 27. The lamps 26 and 27 which are green and red respectively indicate the cab signal lights. The solenoid 24 controls the air brake line valve 28. When the solenoid 24 is energized, the valve 28 is held closed, but upon deenergization of the solenoid 24 the valve 28 opens automatically, thereby applying the brakes.

The operation of this apparatus is as follows: When a train enters a clear block, current is shunted through the axle 11 from the rails 10. The flow of current through the axle induces current in the coils 15, this current being impressed upon the input of the amplifier 18, the current from the output thereof being sufficient to energize the relay 20 to hold its armature 21 in engagement with the contact 22. This closes the parallel circuits through the solenoid 24, the green lamp 26 and the battery 25. The valve 28 is held closed and the engineer is given a clear signal. However, if there is another train in the block, this first train will have shunted the major portion, if not all, of the current so there will be no flow through the axle 11 of the second train. As a result, the current in the output circuit 19 of the amplifier on the second train will be insufficient to hold the armature 21 in engagement with the contact 22. It will therefore drop into engagement with the contact 23. The solenoid 24 will be deenergized, thereby allowing the valve 21 to open, exhausting brake pipe pressure to atmosphere and thereby applying the train brakes, and the lamp 27 will give the engineer the danger signal. Likewise if for any reason an interruption occurs of the track circuit, the input circuit of the amplifier, or the circuit including the coils 15, the solenoid 24 will be deenergized, thereby applying the brakes and lighting the danger lamp 27.

Preferably only the front axle of the vehicle is used for collecting current from the rails. Tests and measurements made by applicant have shown an appreciable current flows through the front axle, whereas only a much smaller current flows through the second axle, and the flow through the remaining axles is practically negligible. A path of higher electrical resistance exists from the rail on one side of the vehicle to the opposite rail from the first axle and wheels of the vehicle to all of the successive axles and wheels of the train, than that which exists across the front axle and wheels from rail to rail. The electrical resistance of the pieces of track rails on each side of the vehicles from and under the wheels and axles of one vehicle-truck to the next following vehicle-truck wheels and axles will add together, accounting for the aforesaid higher path of electrical resistance. An oil film in all of the axle bearings also opposes the easy flow of current from the axles to the metal upper-construction of the locomotive and cars. Moreover, when there is a train in a block, a shunt between the rails to the rear of the train produces the flow of an inappreciable amount of current through the shunt. This has been found to be true by applicant by actual measurements. It is for these reasons that the circuit is limited to the front axle and upon this fact is based the successful operation of the apparatus in causing the application of the brakes of a train entering a block already occupied by another train.

Having thus described my invention, what I claim as new and desire to secure by Letters Patent of the United States is:—

1. Brake controlled apparatus for vehicles mounted on rails comprising a valve for controlling the application of the brakes, electro-magnetic means for holding said valve closed, a metal sheet surrounding an axle of the vehicle and having its edges connected through the cores of a plurality of coils, an amplifier circuit inductively connected to said coils, and a relay in the output circuit of said amplifier for controlling the energization of said electro-magnetic means.

2. Brake controlled apparatus for vehicles mounted on rails comprising a valve for controlling the application of the brakes, electro-magnetic means for holding the valve closed, a trough shaped metallic member enclosing an axle of the vehicle, a plurality of serially connected coils having cores resting upon the upper edges of said trough shaped member, an amplifier circuit inductively related to said coils and a relay in the output circuit of said amplifier for controlling energization of said electro-magnetic means.

3. Brake controlled apparatus for vehicles mounted on rails comprising a valve for controlling the application of the brakes, electro-magnetic means for holding the valve closed, a trough shaped metallic member enclosing an axle of the vehicle, a plurality of serially connected coils having cores resting upon the upper edges of said trough shaped member, said trough shaped member and cores being composed of a plurality of thin sheets, an amplifier circuit inductively related to said coils and a relay in the output circuit of said amplifier for controlling energization of said electro-magnetic means.

4. Automatic train control apparatus comprising rails connected with a source of alternating current, a vehicle mounted on said rails, an amplifier circuit, a valve for controlling the application of the vehicle brakes, electro-magnetic means for holding the valve closed, a relay for controlling energization of said electro-magnetic means, a metal trough partially surrounding an axle of the vehicle, a plurality of coils inductively related to said amplifier circuit and their cores electrically connected to the edges of said trough.

5. A system of train control comprising rails serially connected at the exit end of a block with a source of alternating current, a vehicle mounted on said rails, a valve for controlling the application of the vehicle brakes, electro-magnetic means for holding the valve closed, a relay for controlling energization of said electro-magnetic means, an amplifier having its output circuit connected with the field winding of said relay, a metal trough surrounding an axle of the vehicle, a plurality of serially connected coils having cores electrically connected to the edges of said trough and connections between said coils and the in-put of said amplifier.

6. A system of train control comprising rails serially connected at the exit end of a block with a source of alternating current, a vehicle mounted on said rails, a valve for controlling the application of the vehicle brakes, electro-magnetic means for holding the valve closed, a relay for controlling energization of said electro-magnetic means, an amplifier having its output circuit connected with the field winding of said relay, a trough shaped metallic member surrounding an axle of the vehicle and having its upper edges connected by the cores of a plurality of coils, and an inductive connection between said coils and the input of said amplifier.

7. Brake-controlled apparatus for vehicles mounted on rails comprising a valve for controlling the application of the brakes, electromagnetic means for controlling the operation of said valve, a metal sheet partially surrounding an axle of the vehicle and having its edges mechanically and electrically connected to the cores of a plurality of coils, an amplifier circuit inductively connected to said coils, and a relay in the output circuit of said amplifier for controlling the energization of said electromagnetic means.

8. Brake-controlled apparatus for vehicles mounted on rails comprising a valve for controlling the application of the brakes, electromagnetic means for controlling the operation of the valve, a trough-shaped metallic member partially enclosing an axle of the vehicle, a plurality of serially-connected coils, electrically and mechanically connected to the upper edges of said trough-shaped member, an amplifier circuit inductively related to said coils, and a relay in the output circuit of said amplifier for controlling energization of said electromagnetic means.

9. Brake-controlled apparatus for vehicles mounted on rails comprising a valve for controlling the application of the brakes, electromagnetic means for controlling the operation of the valve, a trough-shaped metallic member partially enclosing an axle of the vehicle, a plurality of serially-connected coils having cores mechanically and electrically connected to the upper edges of said trough-shaped member, said trough-shaped brake member being composed of a purality of thin sheets, an amplifier circuit inductively related to said coils, and a relay in the output circuit of said amplifier for controlling energization of said electromagnetic means.

10. Brake-controlled apparatus for vehicles mounted on rails comprising an amplifier, a valve for controlling the application of the vehicle brakes, electromagnetic means for controlling the operation of the valve, a relay in the output circuit of said amplifier for controlling energization of said electromagnetic means, a metal trough partially surrounding an axle of the vehicle and having its edges connected to the cores of a plurality of serially connected coils inductively connected to the input circuit of said amplifier.

11. Brake-controlled apparatus for vehicles mounted on rails comprising electromagnetic means for controlling the application of the brakes, and a metal trough partially surrounding an axle of the vehicle and having its edges mechanically and electrically connected to the cores of a plurality of serially arranged coils electrically connected to said electromagnetic means.

In testimony whereof, I have signed my name to this specification.

MAX THEODORE WINTSCH.